July 23, 1946.  J. J. FELSECKER  2,404,701
LIQUID TREATMENT
Original Filed July 6, 1942
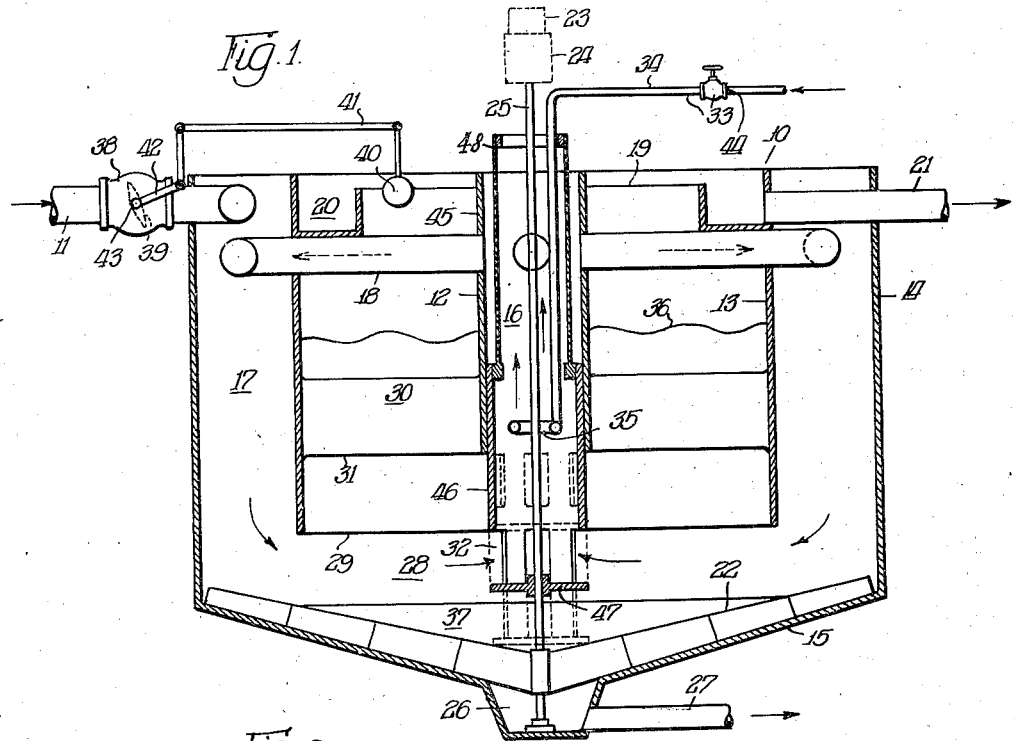
Fig. 1.
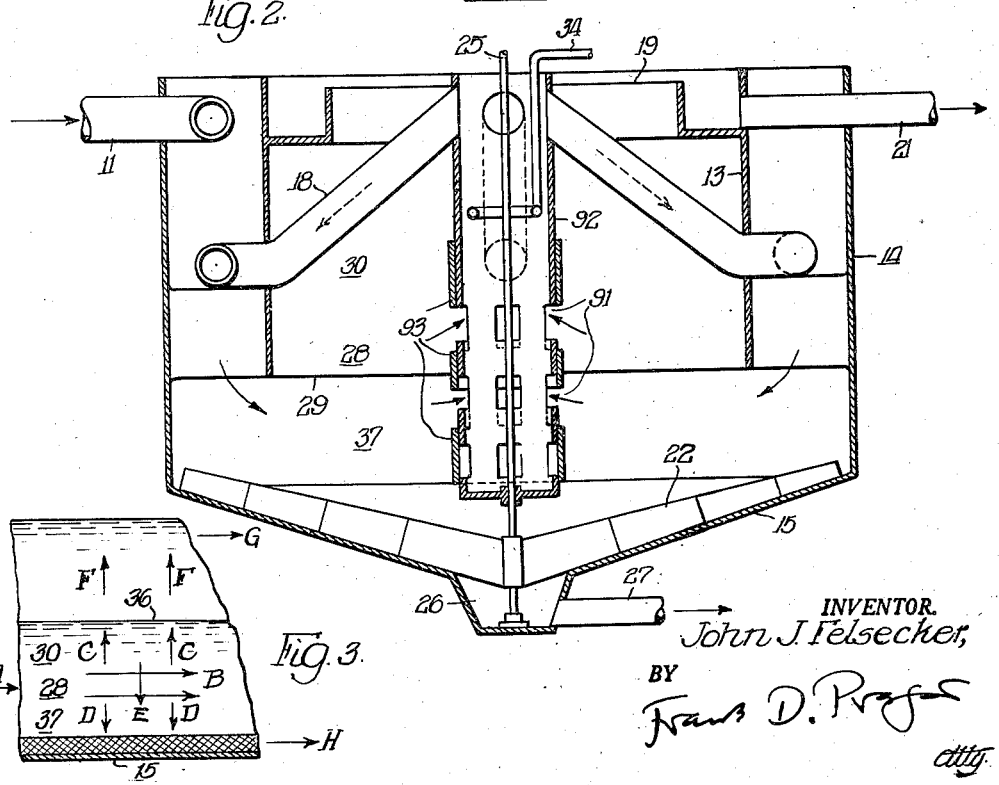
Fig. 2.
Fig. 3.
INVENTOR.
John J. Felsecker,
BY
Frank D. Prager
atty.

Patented July 23, 1946

2,404,701

UNITED STATES PATENT OFFICE 2,404,701

LIQUID TREATMENT

John J. Felsecker, Calumet City, Ill., assignor to Graver Tank & Mfg. Co., Inc., a corporation of Delaware Original application July 6, 1942, Serial No. 449,968, now Patent No. 2,377,545, dated June 5, 1945. Divided and this application January 10, 1944, Serial No. 517,741

5 Claims. (Cl. 210—16)

This invention relates to liquid treatment and particularly to the removal of suspended, colloidal, or dissolved solids from liquids by chemical and physical treatment, with clarification by sludge filtration and sedimentation. The softening of water by an improved lime-soda process is typical for many applications of the invention, and special reference will be had to this application, which illustrates the invention but is not intended to limit the same.

It is an object of this invention to provide an improved method and apparatus capable of purifying a liquid of solids contained and formed therein.

Another object is to provide filtration of the liquid being treated through some of said solids, which are kept in suspension, forming a sludge blanket, this sludge blanket being initially built up from the bottom of the tank, and being so disposed in normal operation as to merge with a subjacent zone of solids settled from the liquids.

Another object is to cause a mixture of liquid and solids to flow as a distributing flow through a liquid body, spaced above the bottom and below the top of the liquid body, to control or adjust the agitative effect of the solids distributing flow on solids present above and below the same, so as to suspend small and medium particles above the same and to settle large particles below the same, and to clarify the liquid by sludge filtration in a flow upwardly branching off from the distributing flow, and by sedimentation of solids below the distributing flow.

According to a particular feature I recirculate parts of said distributing flow into the mixture to be introduced, whereby changes in the flow rate of the mixture may be compensated for, the distribution of liquid and solids in the solids blanket may be improved, precipitation and flocculation promoted by sludge recirculation, and other advantages obtained.

Other objects are to provide favorable conditions for the sludge blanket and other operative zones and parts of the liquid, as well as suitable means for controlling, guiding, stilling, or segregating the fluid flows, suitable passages and openings for the circulating flows, means for adjusting the distance or relationship between the solids distributing flow and adjacent fluid bodies, and other necessary or desirable equipment.

Still other objects and advantages may appear on consideration of this disclosure.

In the drawing,

Figure 1 is a cross-sectional elevation of apparatus embodying this invention.

Figure 2 is a similar view of a modified embodiment.

Figure 3 is a diagram of liquid flows in the apparatus of Figure 1.

The tank 10 has an inlet 11, through which it receives the newly introduced hard water, previously dosed with any required softening and coagulating chemicals, or other precipitants. The tank is shown round, and substantially subdivided into three concentric compartments, by two annular, concentric partitions, the inner one of which is shown at 12 and forms a central standpipe, while the outer is shown at 13 and is relatively close to the tank wall 14. These partitions 12 and 13 extend vertically from the top of the tank to points above the tank bottom 15. An airlift or central mixing chamber 16 is surrounded by the central standpipe 12, and an annular chamber 17 for primary precipitation treatment is confined by the tank wall 14 and the inner wall 13. Radial pipes 18 are installed adjacent the top of the tank, between the top of the central standpipe 12 and the top of the wall 13, whereby the top of the airlift chamber 16 communicates with the top of the primary precipitation chamber 17 and discharges tangentially thereof, to provide or promote a spiral flow, including a rotation of the liquid in said chamber.

The inlet pipe 11 enters the top of the primary chamber 17. On the inside of the inner annular wall 13, and adjacent to its top, there is an annular overflow weir 19 providing for the discharge of softened and clarified water into a circular launder 20 discharging through an effluent conduit 21. The weir determines the lowest point to which the liquid level in the tank can fall in operation, except when the tank is drained for cleanout or repair.

The water received through the inlet 11 may carry flocculent material, and flocs will be precipitated as the water flows through the tank. The process carried out in this tank is of the type wherein small and medium size flocs are carried along or suspended by the liquid flow, while large solids or flocs settle to the tank bottom 15. This settling of flocs may start in the primary well 13, and flocs may settle on the bottom below that well. This bottom is substantially flat, especially in large tanks. Portions of the settled solids are continuously picked up and laterally removed by scrapers 22, which slowly rotate over the bottom, being driven by a motor 23 and speed reducer 24, through a central vertical shaft 25. The solids removed by the scrapers are received in a central sump 26 from which they are ultimately withdrawn, in well-known manner, through a conduit 27.

The water carrying all the flocs except the largest, which have settled out in the primary well 12 flows horizontally inward into and through the distribution zone 28, passing first below the lower edge 29 of the annular wall 13 and finally upward, through the sludge filtration zone 30. The distribution zone 28 is located in the space inside of the wall 13 at an elevation adjacent to that of the lower edge 29 of said wall, while the sludge filtration zone 30 extends upwardly from this distribution zone, inside of the wall 13. The rotation of the liquid continues in the distribution zone 28. It is an aid to flocculation. It also serves to freely distribute liquid and solids over the tank area. Therefore this rotation may be allowed to continue at least in a part of the upward flow through the sludge filtration zone 30. However, ultimately this rotation may be stilled by vertical radial baffles 31 which extend inward from the wall 13. Thereupon, the further upward flow is substantially straightlined and vertical.

However, only part of the water entering the distribution zone 28 flows upward through the sludge filtration zone 30 and over the weir 19. Another part of this water is drawn into a bottom opening or openings 32 of the standpipe 12, upon operation of an airlift device 33. This airlift device comprises a source of compressed air (not shown), a pipe 34 from that source to a lower, inner part of the space defined by the inner periphery of the standpipe 12, and air distributor means 35 at the end of this pipe within said space. As air escapes from this distributor a mixture of air, water, sludge and chemicals is formed within the standpipe, and this mixture tends to rise, due to the fact that it has a lower specific weight than the surrounding fluids. Since the top of the standpipe 12 communicates with other zones through the passage ways 18, 17, and 28, which return to the openings 32, a closed circulation of said mixture is established and maintained, along said passage ways, and in the direction as indicated. This circulation can continue in case of a slow-down or shut-down of the throughput flow which rises through the sludge filtration zone 30 to the overflow weir 19.

A sludge filter or blanket 36 is built up in the zone 30. The treatment of the water is completed in this sludge filter. Treated water emerges from the sludge filter and overflows over the weir 19. The solids or flocs agglomerate, and are ultimately removed by settling down through the sludge filtration and distribution zones 30 and 28 into a quiescent sediment zone 37 which extends downwardly from the distribution zone 28 to the bottom of the tank.

Relatively quiescent conditions are maintained in this sediment zone 37, while there is relative commotion due to the spiralling, distributing flow in the superposed distribution zone 28.

For a complete understanding of the operation of my improved process and apparatus, it must be considered that, when softening reagents are added to a hard water, the resulting solid precipitates or flocs of hardness constituents are formed at different rates, velocities, and degrees of completeness. Some calcium carbonate flocs of fair size may appear after a few minutes, whereas other solid particles of the same substance may appear only after many hours. Also, some of said flocs, as originally formed may be large or heavy, whereas other solids of the same chemical composition may be exceedingly small or light when originally formed. At every point of a liquid flow containing such precipitates in process of formation, treatment, or removal, there will be found some such precipitates which are relatively large, heavy, prematurely formed, and readily settleable, and others of intermediate size, weight, and settling characteristics. There may be still others which are so light, small or incomplete as to settle relatively slowly or not to settle at all. In connection with the latter group, there may be mentioned those hardness constituents which are still present in a dissolved or similar state, which have not completed their chemical reaction with the softening, precipitating, or coagulating reagents, or which have not completed the physical reaction of precipitation or flocculation incident to which they appear for the first time as suspended, solid particles or flocs.

In accordance herewith the water and the relatively incomplete precipitates are continuously contacted with a retained sludge of previously formed precipitates of intermediate size and weight; the largest, heaviest, completed precipitates being removed by sedimentation, as soon as they have been formed. In this process, a liquid particle may pass through the tank in an average period of one hour or less. During a first part of this period, flocs may be originally formed, by primary precipitation in the liquid particle. During the greatest part of this time the liquid particle, carrying a continuously decreasing amount of solids, percolates through the sludge blanket; that is, through a retained mass of solids previously formed and being newly formed, agglomerated, and increased in size. A small solid particle originally formed in the primary flow may be present in this mass for many hours, or even days, during which time it generally increases in size due to agglomeration with other particles previously formed or being newly formed. The larger a particle becomes, the more it tends to subside in the mass or blanket of particles. Occasionally, particles will be partly broken up, when engaged by rapid portions of the spirally rotating flow; whereupon they may tend to rise again. The spirally rotating flow of this invention, as stated before, is upwardly spaced and functionally separated from the quiescent sedimentation zone, and thus disturbance of the sedimentation zone is prevented. The particles are ultimately agglomerated into large, heavy, and well coagulated flocs, which are no longer readily subject either to disintegration or to growth under the conditions of the process. These are no longer retained in the sludge blanket, but removed by sedimentation. As they settle through the sludge blanket and into the subjacent sediment zone they displace liquid upwardly. These downward and upward exchanges or movements are preferably allowed to occur throughout the whole area of the sludge blanket, or at least in substantial parts thereof, so as to facilitate and accelerate the gravitational separation of the large, heavy, and complete flocs from the sludge retained in the filter or blanket.

In order to start the operation I fill the tank 10 with water to the level of the overflow weir 19. Thereafter, I continuously add water and chemicals through the inlet 11 and withdraw equal amounts of water through the effluent pipe 21. In the beginning, the chemical treatment results in conditions which are none better than those obtained in earlier softening apparatus; and for this reason, the initial rate of flow or throughput through the tank is preferably kept very slow, that is, ordinarily less than one gallon per square foot of tank area per minute. With higher initial flow rates, most of the flocs formed are entrained and carried out with the water over-flowing over the weir 19, and a sludge bed is formed only after a longer period of initial treatment. The desirable, slow, initial rate of flow may be enforced by proper adjustment of a float inlet valve 38, which may have a disc 39 actuated by a float 40 through a linkage 41 comprising a crank 42 which is angularly adjustable on the valve stem 43; or adjustment may be obtained in other suitable ways. Even with such a slow rate of initial flow, many of the flocs initially formed are and remain so small that they are carried out over the weir 19. For this reason the water discharged during initial operation is generally unsatisfactory for such use or consumption as may be contemplated for the water when fully treated in accordance with this invention.

Flocs of calcium carbonate and the like will settle from the slow, initial flow, to the tank bottom 15. Preferably during initial operation, these flocs are not removed through the sludge sump 26 and the pipe 27. The scrapers 22 may be kept at rest, or I may rotate them from time to time, at a very slow rate and for short periods only. Gradually, the whole of the sediment zone 37 may be filled with settled sludge.

As the operation continues the sludge sediment tends to be built up above the bottom zone 37, into the distribution zone 28. From this moment on, if not before, the rate of flow is increased, by proper re-adjustments of valve 38 or of any other control means, so that the sludge present in the distribution zone 28 is largely re-suspended and the newly entering sludge is largely held in suspension, and parts thereof are carried into the superimposed zone 30, starting the formation of a suspended sludge blanket. Of course the chemical dosage is increased proportionally. Caution must be applied to avoid any excessive or abrupt readjustment of valves leading to a sudden or excessive increase in the rate of flow, which would cause the suspended flocs to be entrained and carried out over the weir 19. It must be understood that at this point, the initial treatment is not fully completed yet. The bulk of the initial sludge filter consists of small flocs, and this initial filter cannot be expected to provide complete treatment at a high flow rate. The flow rate may be raised gradually, and it must be anticipated that for a short time after each increase the overflow will contain relatively more small flocs again.

Gradually, however, the overflow will become clear, and thereafter it will remain clear, even upon a further increase of the flow rate within certain limits of tank capacity. This is due to the fact that the beneficial effects of the sludge blanket 36 play their part increasingly; and the flocs in the sludge blanket itself become larger and heavier. A further increase in the rate of throughput, as mentioned, becomes feasible; in fact, it is desirable, in order to keep a sufficient supply of flocs in suspension, and to prevent depletion of the sludge blanket 36.

Pursuant to this final increase of the throughput rate, the operation may be considered normal, and may be continued indefinitely. From this moment on, sludge must be withdrawn through the pipe 27 at substantially the same rate at which new sludge is deposited.

The sludge blanket 36 in the filtration zone 30 according to the present invention contains only, or at least primarily, the sludge which fails to settle into the sediment zone 37; that is, the flocs of small and medium size, which are readily subject to growth and agglomeration under the conditions of the process. The flow conditions affecting and surrounding this improved sludge bed 36 in normal operation, are diagrammatically shown in Figure 3. The flow A which passes into and through the primary precipitation zone 17 enters the distribution zone 28, wherein it is continued by a horizontal, preferably spiral flow B, bringing liquid and solids to all points below and in the sludge blanket. The sludge blanket 36 as a whole is more or less stationary in the superposed sludge filter zone 30, although considerable liquid movements may be allowed and even enforced therein. At all points of the distributing flow B, upward flows C are branched off therefrom, which enter the superposed sludge filter 36 for final treatment therein.

The liquid in the spiral flow B passing through the distributing zone 28 contains precipitated flocs as well as particles just being precipitated, and perhaps dissolved particles the precipitation of which has hardly started. The upward flows C carry the said particles into the sludge filter 36, which as mentioned consists of generally similar particles, of small and medium size. The liquid percolates through this sludge filter. Incident to this percolating flow, both precipitation and flocculation are promoted and completed.

The largest precipitated and flocculated particles contained in the flow B are constantly settled out, as shown at D. Furthermore, the largest precipitated and flocculated particles formed in the sludge filter zone 30 are constantly settled out as shown at E. Other flocs and particles tending to turn into flocs, are continuously resupplied to the sludge filter, by the flow A from the primary precipitation zone 17. They are uniformly distributed by the flow B, without undue disturbance of the quiescent zone 37.

Practically all the impurities contained in the liquid entering the sludge filter 36 are effectively removed from the liquid, in the sludge filter, including even the smallest particles and the solids most difficult to precipitate in settleable form. Such small particles and incomplete precipitates are agglomerated with and thus retained by the medium and small sized, suspended flocs forming the sludge filter 36. As a result, there is a continuous growth of the suspended flocs forming the sludge filter 36. The smallest and least complete flocs, originally entrained and introduced into the filter, disappear during this upward flow, and a well softened, clarified and stabilized water, causing no after-precipitation on continued detention or flow, emerges at F, to be withdrawn at G.

Flocs which have reached a large size, are no longer suspended, and of course not entrained, by the upward flow C; they settle down to the tank bottom. No attempt is made to hold them in suspension. They settle through the distribution zone 28, where they may be engaged, partly broken up and resuspended by the spiral flow for a while; but they ultimately settle further into the sediment zone 37 and are removed by the scrapers 22, at H.

When reference is had to flocs of certain sizes, of course it will be understood that generally speaking, the largest flocs are also the heaviest ones, and settle more rapidly, or overcome an upward liquid velocity more easily than other, smaller and lighter flocs. Other features than size and specific weight may affect the settleability of the flocs also, but size is generally the most important factor, so long as specific weight and structure are uniform, as is well known to persons skilled in this art.

Reviewing once more the arrangement of the several zones, according to Figure 3, I provide four zones superposed over one another. These zones may be identified as follows, starting at the tank bottom: First, the sediment zone or bottom zone 37; second, the distribution or spiral flow zone 28; third, the sludge filter or sludge blanket zone 30; and fourth, the zone of treated and clarified water adjacent to the launder 20. The primary zone 17 may be viewed as part of the spiral flow zone 28. It will be understood that the said zones merge into one another unobstructedly, except as stated. Necessary steps of the precipitating and coagulating treatment occur in each of the zones, except the sediment zone 37 and the clear water zone. It may be said that precipitation and coagulation starts in the primary zone 17, continues in the distribution zone 28, and is completed in the sludge filter zone 30. It may also be said that a suspended sludge filter or blanket 36 is present below and partly around the zone 30 as well as within the same. It has been shown how this sludge filter is initially built up from the bottom of the tank, where it merges into a layer of sediment.

The location of the opening or openings 32 is very important for this process. At the start of the operation, no sludge bed is present, and thus no sludge can be re-circulated by the air lift device 35 and returned to the distribution zone 28. In order to speed up the starting operation, it is desirable that the openings 32 be located as close as possible to the sludge which accumulates gradually on the bottom of the tank. Thus the openings 32 should be relatively close to the tank bottom, at the start. However, when a suspended sludge bed 36 has been built up and substantially stabilized to the proper condition for normal operation, it is preferable that the openings 32 be spaced relatively farther above the tank bottom. The reason for this is that, as mentioned, light and medium-weighted sludge particles are most desirable in the sludge bed 36; such particles therefore should be recirculated by the airlift; but the heaviest particles, rather than these more desirable ones are found near the tank bottom.

During a generally normal operation, the condition of the sludge bed 36 is subject to changes, upon any slow-down or speed-up of throughput and chemical feed, change of solids concentration, type of solids, pH, temperature, and other conditions of the incoming water, changes in the schedule of sludge withdrawals through the pipe 27, and other changes. As a result, the sludge bed will tend to change as to overall depth thereof, as to percentage of total solids and of medium-sized solids, as to specific weight of medium-sized solids, and in other respects. Such resulting changes, again, may frequently call for a re-adjustment of the location of the openings 32. For instance, if the bed is starved of solids of sufficient size and weight, it will be desirable, at least temporarily, to lower these openings.

Such a change in the location of the openings 32 will re-adjust the direction of the distributing flow B, in a vertical plane, and thereby influence the effective dimensions of the sediment zone 37 and superposed zones. In fact, with a very low setting of these openings, the sediment zone can be made to disappear entirely at least when the liquid circulation caused by the air lift is rapid. This, of course, will necessitate the removal of a relatively diluted sludge, so long as the pipe 27 is used for this purpose; and such operation will be an exception rather than the rule, in most tanks constructed in accordance herewith.

Such a change in the location of the openings 32 may also affect the speed of recirculation, since a heavier sludge will be recirculated at a slower rate than a light sludge; however, this secondary effect generally is insignificant, in the water treatments contemplated herein. On the other hand, the speed or recirculation may be changed arbitrarily, by adjustment of throttle valve 44 in the air inlet pipe 34. Such a re-adjustment of velocity of re-circulation may either promote or counter-act the effects of a readjustment in the location of the openings 32; however, these two methods of re-adjustments are not equivalent to one another. For instance, at the start of operations it is distinctly more desirable to lower the openings 32 than to enlarge the opening through the throttle valve 44, although both operations would have one effect in common; they speed up the return of sludge to the distribution zone 28. The disadvantage in resorting to a more rapid air feed, at that stage, is due to the fact that undesirable comminution of flocs might result; the flocs being particularly sensitive and destructible during this early stage of operations.

Various structures can be used to achieve the vertical adjustment of the openings 32 as explained. In the preferred embodiment of Figure 1, the standpipe 12 consists of two pipes 45 and 46 having telescopic engagement with one another. Pipe 45 forms the upper and outer part of the standpipe while a pipe, tube or ring 46 forms the lower and inner part. This lower and inner part is closed at the bottom by a plate 47, but has a series of openings 32 around the side wall thereof, adjacent the bottom plate 47. Vertical rods 48 are secured to the top of the lower, inner pipe 46 and extend to points adjacent the top of the tank, whereby these rods, and the lower pipe or ring 46 with openings 32 can be raised or lowered by hand, or by suitable power means (not shown).

A modification is shown by Figure 2 which in general provides similar parts and operation as Figure 1 does, but wherein inlet openings 91 of the air lift tube 92 are provided in superposed rows, causing a particularly good and deep distribution of the circulating flow below or through the sludge filter, whereby higher rates of circulation may be provided without undue disturbance of the sludge bed. An adjustment similar to that of Figure 1 may be provided by slidable ring members or gates 93. These ring members are concentric with the air lift tube 92; they may restrict or close some of the superposed openings 91, depending on their vertical adjustment, and they may be vertically adjustable individually or conjointly. It will be seen that by means of this modification, both the vertical location and the effective depth of the set of openings 91 and of the distributing flow B entering the same can be changed. A change in effective depth or size of this set of openings is sometimes desirable, since the size initially selected may be found excessive or insufficient requiring undesirably high or low velocities of air feed; these velocities having various effects as explained, upon the speed of recirculation, type of sludge entering the recirculation, type of sludge discharged into the sludge bed, distribution of materials in the distribution zone and so on.

Various modifications other than those specifically shown and described will suggest themselves to persons skilled in the art, upon a study and consideration of this disclosure. It will be understood that the dimensions, flow velocities, and similar data specified herein are stated only for illustration, and are not intended to limit this invention.

This is a divisionn of my application, Serial No. 449,968, filed July 6, 1942, which has now matured into Patent No. 2,377,545.

I claim:

1. Apparatus for liquid treatment comprising a tank having a peripheral wall, an annular baffle concentric with said wall and extending from a point adjacent to the top of said tank to a point above the bottom of said tank, thereby separating an outer primary chamber from an inner sludge filtration zone, inlet means adapted to discharge liquid to be treated and any reagents required into said tank remotely from said sludge filtration zone, liquid outlet means adjacent to the top of said tank in the space inside said annular baffle, circulator means adapted to cause a flow from the space within the lower part of said annular baffle to the space outside of the upper part of said annular baffle, sludge outlet means associated with the bottom of said tank, and means adapted to convey sludge over the bottom of said tank to said sludge outlet means, said circulator means comprising a fixed updraft tube centrally and vertically disposed in said tank, means for liquid communication between the top of said updraft tube and the space between said peripheral wall and said annular baffle, a movable tube in telescopic relationship with the lower part of said fixed updraft tube, and means to set the movable tube in a predetermined position, said tubes being adapted to provide liquid communication with the lower part of said sludge filtration zone at an elevation which depends on the setting of said movable tube.

2. Apparatus for liquid treatment comprising a tank, two annular partitions concentric with said tank, extending from adjacent the top of said tank to points above and adjacent to the bottom of said tank, and forming an inner mixing chamber and two outer chambers in said tank, means for liquid communication whereby the top of said mixing chamber communicates with the top of one of said outer chambers which thereby serves as a primary precipitation chamber, the other outer chamber being a chamber for sedimentation and sludge filtration, inlet means adapted to discharge liquid to be treated and any reagents required into one of said chambers other than said sedimentation chamber, liquid outlet means in said sedimentation chamber adjacent the top thereof, sludge outlet means in said tank vertically spaced below said liquid outlet means, circulator means adapted to maintain a liquid circulation through said mixing chamber, downwardly through said primary precipitation chamber and in an inward flow back into said mixing chamber, and means associated with one of said annular partitions and adapted to raise and lower at least a lower part of the respective partition.

3. Apparatus for liquid treatment comprising a tank, two annular partitions concentric with said tank, extending from positions adjacent the top of said tank to positions above and adjacent to the bottom of said tank, and forming an inner mixing chamber and two outer chambers in said tank, the top of said mixing chamber communicating with the top of one of said outer chambers which thereby serves as a primary precipitation chamber, the other outer chamber being a chamber for sedimentation and sludge filtration, inlet means adapted to discharge liquid to be treated and any reagents required into one of said chambers other than said sedimentation chamber, liquid outlet means in said sedimentation chamber adjacent the top thereof, sludge outlet means in said tank vertically spaced below said liquid outlet means, circulator means adapted to maintain a liquid circulation upwardly through said mixing chamber, downwardly through said primary precipitation chamber and in an inward flow back into said mixing chamber, the bottom of said mixing chamber communicating with the other chambers through at least one opening, and means associated with the inner annular partition, adapted to raise and lower said opening.

4. Apparatus according to claim 3 comprising means associated with the inner annular partition, adapted to enlarge and restrict said opening incident to said raising and lowering thereof.

5. Apparatus for liquid treatment comprising a tank, two annular partitions concentric with said tank, extending from positions adjacent the top of said tank to positions above and adjacent to the bottom of said tank, and forming an inner mixing chamber and two outer chambers in said tank, the top of said mixing chamber communicating with the top of one of said outer chambers which thereby serves as a primary precipitation chamber, the other outer chamber being a chamber for sedimentation and sludge filtration, inlet means adapted to discharge liquid to be treated and any reagents required into one of said chambers other than said sedimentation chamber, liquid outlet means in said sedimentation chamber adjacent the top thereof, sludge outlet means in said tank vertically spaced below said liquid outlet means, circulator means adapted to maintain a liquid circulation upwardly through said mixing chamber, downwardly through said primary precipitation chamber and in an inward flow back into said mixing chamber, the bottom of said mixing chamber communicating with the other chambers through at least one opening, gate means associated with the inner annular partition adjacent said opening, adapted to be raised and lowered with respect to said opening, and means extending from said gate means upward to the top of said tank to raise and lower said gate means.

JOHN J. FELSECKER.